United States Patent
Pere et al.

(10) Patent No.: US 11,931,774 B2
(45) Date of Patent: Mar. 19, 2024

(54) COATED WOOD VENEER AND METHOD FOR TREATING WOOD VENEER

(71) Applicants: TEKNOLOGIAN TUTKIMUSKESKUS VTT OY, Espoo (FI); AALTO UNIVERSITY FOUNDATION SR, Aalto (FI)

(72) Inventors: Jaakko Pere, VTT (FI); Vesa Kunnari, VTT (FI); Matti Kairi, Aalto (FI); Pekka Ahtila, Aalto (FI)

(73) Assignees: TEKNOLOGIAN TUTKIMUSKESKUS VTT OY, Espoo (FI); AALTO UNIVERSITY FOUNDATION SR, Aalto (FI)

(*) Notice: Subject to any disclaimer, the term of this patent is extended or adjusted under 35 U.S.C. 154(b) by 330 days.

(21) Appl. No.: 16/963,878

(22) PCT Filed: Jan. 16, 2019

(86) PCT No.: PCT/FI2019/050031
§ 371 (c)(1),
(2) Date: Jul. 22, 2020

(87) PCT Pub. No.: WO2019/145600
PCT Pub. Date: Aug. 1, 2019

(65) Prior Publication Data
US 2021/0039134 A1 Feb. 11, 2021

(30) Foreign Application Priority Data

Jan. 23, 2018 (FI) ........................... 20185063

(51) Int. Cl.
B05D 7/10 (2006.01)
C09D 101/02 (2006.01)
B05D 3/02 (2006.01)

(52) U.S. Cl.
CPC .............. B05D 7/10 (2013.01); C09D 101/02 (2013.01); *B05D 3/0254* (2013.01); *B05D 2401/20* (2013.01)

(58) Field of Classification Search
None
See application file for complete search history.

(56) References Cited

U.S. PATENT DOCUMENTS

| | | | |
|---|---|---|---|
| 5,652,065 A * | 7/1997 | Park | B32B 38/08 428/218 |
| 2004/0062872 A1 | 4/2004 | Matsumura | |
| 2011/0293932 A1 | 12/2011 | Jiang et al. | |
| 2013/0061774 A1 * | 3/2013 | Landry | C08F 251/02 106/204.3 |
| 2016/0002462 A1 | 1/2016 | Zhang et al. | |
| 2016/0145480 A1 | 5/2016 | Krigstin et al. | |
| 2016/0355710 A1 | 12/2016 | Feng et al. | |
| 2017/0239836 A1 | 8/2017 | Zhan et al. | |
| 2017/0370047 A1 * | 12/2017 | Nelson | D21C 9/10 |
| 2018/0213789 A1 * | 8/2018 | Gupta | A61K 47/34 |

FOREIGN PATENT DOCUMENTS

| | | |
|---|---|---|
| JP | 2004-114501 A | 4/2004 |
| JP | 2013-515103 A | 5/2013 |
| RU | 2438082 C2 | 12/2011 |
| RU | 2476311 C1 | 2/2013 |
| WO | 2007/132057 A1 | 11/2007 |
| WO | 2011/147029 | 12/2011 |
| WO | 2015/011337 | 1/2015 |
| WO | 2016/082025 | 6/2015 |
| WO | 2015/150620 | 10/2015 |
| WO | 2015/092146 | 2/2016 |
| WO | 2016/181258 | 11/2016 |

OTHER PUBLICATIONS

Qiao et al., "Structure and rheological properties of cellulose nanocrystals suspension", Food Hydrocolloids, 55 (2106), pp. 19-25 (Year: 2016).*
Barnes, H.A. and Nguyen, Q.D., "Rotating vane rheometry—a review," J. Non-Newtonian Fluid Mech. 98 (2001) 1-14.
Office Action and Search Report issued in Russian Patent Application No. 2020127877 dated Jun. 14, 2022.
International Search Report for PCT/FI2019/050031, dated Jun. 24, 2019, 5 pages.
Written Opinion of the ISA for PCT/FI2019/050031, dated Jun. 24, 2019, 10 pages.
Search Report for FI20185063, dated Aug. 22, 2018, 2 pages.

* cited by examiner

*Primary Examiner* — Shamim Ahmed
*Assistant Examiner* — Bradford M Gates
(74) *Attorney, Agent, or Firm* — NIXON & VANDERHYE

(57) ABSTRACT

Disclosed is a method for treating wood veneer, including the steps of providing at least one sheet of wood veneer; coating at least one side of the sheet of wood veneer with an aqueous coating composition including nanocellulose to obtain a coated sheet of wood veneer; and drying the coated sheet using compression pressure and heat. Also disclosed is a coated wood veneer including a sheet of wood veneer and a coating including nanocellulose arranged on at least one surface of the sheet.

16 Claims, No Drawings

COATED WOOD VENEER AND METHOD FOR TREATING WOOD VENEER

This application is the U.S. national phase of International Application No. PCT/FI2019/050031 filed 16 Jan. 2019, which designated the U.S. and claims priority to FI Patent Application No. 20185063 filed 23 Jan. 2018, the entire contents of each of which are hereby incorporated by reference.

FIELD OF THE INVENTION

The present disclosure relates to a method for treating wood veneer. The present invention further concerns coated wood veneer.

BACKGROUND OF THE INVENTION

In the production of wood veneer, wood veneer sheets are cut from the tree trunk, followed by drying. During drying, veneer sheets are typically warped and buckled, which effects the quality, appearance and utility of said sheets, whereby part of said sheets are even discarded. Handling of buckled and warped veneer sheets with automated machines, for example for producing plywood or laminated veneer lumber, is difficult and thus often requires complex machinery or manual handling, which reduces the production speed and increases costs.

Document WO 2016/082025 discloses a stable aqueous composition comprising an aqueous component, a hydrophobic complex comprised of a multivalent metal salt complexed with nanocellulose fibres and lignin, with the composition exhibiting a viscosity sufficient to prevent coalescing and settling of the hydrophobic complex in the aqueous component. The composition may be used to coat surfaces of articles to produce a hydrophobic surface. Once applied to the surface, the aqueous coating is spread to form a wet film covering the surface and is then dewatered and dried to produce a dried hydrophobic coating.

BRIEF DESCRIPTION OF THE INVENTION

An object of the invention is to provide an improved method for treating wood veneer.

Another object of the invention is to provide coated wood veneer with improved rigidity and tensile strength.

The objects are achieved by a method and coated wood veneer which are characterized by what is stated in the independent claims. Preferred embodiments of the invention are disclosed in the dependent claims.

The invention is based on the idea of coating a sheet of wood veneer with an aqueous coating composition comprising nanocellulose in an amount between 4 to 18% by weight, calculated of the weight of the total coating composition, the nanocellulose having an apparent viscosity between 8 000 and 22 000 mPa·s in the consistency of 5% by weight at the temperature of 20° C., and drying the sheet of wood veneer using compression pressure and heat.

The method of the invention concerns treating wood veneer, where said method comprises the steps of
providing at least one sheet of wood veneer;
coating at least one side of the sheet of wood veneer with an aqueous coating composition comprising nanocellulose in an amount between 4 to 18% by weight, calculated of the weight of the total coating composition, the nanocellulose having an apparent viscosity between 8 000 and 22 000 mPa·s in the consistency of 5% by weight at the temperature of 20° C., to obtain a coated sheet of wood veneer; and
drying the coated sheet using compression pressure and heat.

The coated wood veneer of the invention comprises a sheet of wood veneer and a coating comprising nanocellulose arranged on at least one surface of the sheet, and the nanocellulose comprises cellulose nanofibrils having an apparent viscosity between 8 000 and 22 000 mPa·s in the consistency of 5% by weight at the temperature of 20° C.

An advantage of the method of the invention is that the warping and buckling of the wood veneer are reduced, which make it easier to handle, for example with automated machines. The obtained coated wood veneer is also more rigid, and it has improved straightness. The method of the invention allows also using thinner veneers in various applications, such as plywood or laminated veneer lumber.

An advantage of one embodiment of the invention is that the obtained coated wood veneer has improved tensile strength in cross direction, i.e. in the direction that is transversal to the grain direction of the wood veneer.

Additionally, because the coating comprises cellulose, which is a hygroscopic material, the coating does not prevent the natural "breathing" of wood, i.e. the exchange of moisture between the wood veneer and the surrounding air. In other words, the coating maintains the diffusion open surface of wood. With the method of the invention, the natural properties specific to wood can be maintained and a product containing only renewable material can be obtained. With the method of the invention, a veneer with higher brightness and evenness of colour can also be obtained. Lignin, present in the wood veneer and optionally in the nanocellulose reduces hygroscopicity of the wood veneer. Lignin in the nanocellulose also improves the wear resistance of the surface of the veneer.

Conventional nanocellulose is made by refining cellulose fibres to obtain an average fibril length of several micrometres. Consequently, the apparent viscosity of an aqueous suspension of conventional nanocellulose is typically very high even at low consistencies of about 3% by weight, whereby suspensions thereof, with higher consistency cannot be used in practise.

Nanocellulose having typical average fibril length of between 100 to 1000 nm provides aqueous suspensions that are still easy to handle and spread or dose, also at much higher consistency, and consequently it is particularly suitable for the present invention.

The drying of the coated sheet using compression pressure and heat enhances the adherence of the nanocellulose on/in the sheet, which increases the transverse tensile strength of the coated wood veneer significantly. No additional adhesives are needed. Further, the drying method is energy efficient, whereby costs are reduced.

Definitions

The term "wood veneer" refers here to a thin piece of wood having thickness of 0.1 to 6 mm, preferably 0.1 to 4 mm.

The term "wood veneer sheet" refers here to wood veneer having a certain width and length.

The term "nanocellulose" refers here to nano-structured cellulose, such as cellulose nanofibers (CNF), nanofibrillated cellulose (NFC), microfibrillated cellulose (MFC) or cellulose nanocrystals (CNC), particle of which has one dimension in region of less than 100 nm.

The term "enzymatic nanocellulose" refers here to nanocellulose that is produced enzymatically.

The term "tensile strength" refers here to the capacity of a material or structure to withstand loads tending to elongate, expressed in N/mm². Tensile strength is measured using modified ISO 1924-2 standard method. The method is modified by replacing the paper or board with a corresponding piece of veneer. The measurement is preformed using sheets sized 50×100-150 mm (grain direction×cross direction).

The term "fibril" refers here to fibre-like strand consisting mostly of cellulose.

The term "laminated veneer lumber" (LVL) refers here to a wood product that comprises multiple layers of thin wood assembled with adhesives.

DETAILED DESCRIPTION OF THE INVENTION

The invention relates to a method for treating wood veneer and to coated wood veneer.

Method for Treating Wood Veneer

The method comprises providing at least one sheet of wood veneer. According to an embodiment, the wood veneer is rotary cut or rotary peeled wood veneer, i.e. wood veneer made using rotary lathe. According to an alternative embodiment, the wood veneer is sliced wood veneer or sawn wood veneer.

The wood species may be selected from hardwood and softwood. Suitable wood species are all wood species that can be processed with a rotary lathe or veneer slicing machine. In an embodiment, the wood species is selected from the group consisting of birch, spruce, pine, beech and oak.

Preferably, the wood veneer has a moisture content of at least 30% by weight of dry wood. If the moisture content of the wood veneer is lower, the bonding of the aqueous coating composition to the wood veneer may be reduced.

The method comprises coating the sheet of wood veneer with an aqueous coating composition to obtain a coated sheet of wood veneer.

Particularly, the method of the invention concerns treating wood veneer, where said method comprises the steps of
providing at least one sheet of wood veneer;
coating at least one side of the sheet of wood veneer with an aqueous coating composition comprising nanocellulose in an amount between 4 to 18% by weight, calculated of the weight of the total coating composition, the nanocellulose having an apparent viscosity between 8 000 and 22 000 mPa·s in the consistency of 5% by weight at the temperature of 20° C., to obtain a coated sheet of wood veneer; and
drying the coated sheet using compression pressure and heat.

According to an embodiment, the aqueous coating composition comprises water between 75 and 96% by weight of total coating composition, preferably between 88 and 92% by weight.

According to an embodiment, the aqueous coating composition comprises nanocellulose between 4 and 18% by weight of total coating composition, preferably between 7 and 16% by weight, particularly preferably between 8 and 14% by weight, even more preferably between 8 and 12% by weight.

The nanocellulose has an apparent viscosity between 8 000 and 22 000 mPa·s, preferably between 10 000 and 20 000 mPa·s, more preferably between 12 000 and 18 000 mPa·s, in the consistency of 5% by weight at the temperature of 20° C.

The apparent viscosity is suitably measured using Brookfield rheometer. The standard method is based on vane geometry, which is widely recommended for paste-like materials, gels, and fluids, where suspended solids migrate away from the measurement surface of standard smooth spindle geometries such as cone—plate, coaxial cylinder, parallel—plate, or a disk spindle immersed in a beaker. The fibrillated sample is diluted with water to a constant concentration of 5% before measurement. The sample is first mixed for about 10 min and at about 300 rpm. Then the mixed sample is further dispersed for example two minutes at 14000 rpm. Viscosity measurements are done using a suitable spindle for nanocellulose in 5% concentration. Each sample is left to stand still for a short period of time after dilution and prior to measurement. This allows each sample to regain their initial viscosity for a fixed period of time. The sample temperature is maintained at 20±1° C. between the measurements. Viscosity is measured twice from each sample.

The nanocellulose has an average fibril length of between 100 to 1000 nm, preferably between 100 to 500 nm. The average fibril length is measured by microscope determination.

According to a preferable embodiment, the nanocellulose is enzymatic nanocellulose. This kind of nanocellulose is obtainable from pulp, for example using the process described in document WO 2015/092146 A1.

Due to short average fibril length, particularly that of enzymatic nanocellulose, an aqueous coating composition, in the form of a suspension can be obtained with higher consistency than with conventional nanocellulose, and it can be conveniently applied to the surface of wood veneer. Thus, a smaller amount of water and a higher amount of the nanocellulose are applied to the surface of wood veneer.

According to an embodiment, the aqueous coating composition is applied on the sheet of wood veneer in an amount between 2 and 100 g/m², preferably between 5 and 50 g/m², particularly preferably between 5 and 30 g/m², measured as the amount of dry coating composition.

The coating may be applied as one layer or alternatively as more than one layers. If the coating is applied as more than one layers, a coating layer is applied to one side of the sheet of wood veneer and then a subsequent coating layer is applied to the one side of the sheet. The coated sheet is preferably not dried between application of different coating layers. The more than one layers may comprise the same coating composition or different coating compositions.

According to an embodiment, the nanocellulose comprises lignin at most 10% by weight of the nanocellulose, preferably from 0.01 to 5% by weight, more preferably from 0.01 to 3% by weight. Lignin increases the adhesion of the nanocellulose to the parts of the wood veneer where the lignin content is higher by promoting bonds between lignin molecules of the nanocellulose and lignin molecules of the wood veneer. Additionally, lignin makes the coated surface less hydrophilic.

According to another embodiment, the enzymatic nanocellulose comprises lignin at most 10% by weight of enzymatic nanocellulose, preferably from 0.01 to 5% by weight, most preferably 0.01 to 3% by weight.

The aqueous coating composition may comprise one or more additives.

The aqueous coating composition can also be used as a carrier for the additives for applying and adhering the additives to the surface of the wood veneer.

According to an embodiment, the aqueous coating composition comprises at least one additive selected from the group consisting of light absorbing additives, anti-mould agents, anti-microbial agents, fire-retarding agents, colour agents, decorative components, surface active agents and combinations thereof.

When wood veneer is produced from a tree trunk using rotary lathe, wood veneer with convex side, or tight side, and with a concave side, or loose side, is obtained. The concave side is the surface of the wood veneer that was located towards the heart, or core, of the wood. During the production, lathe checks are formed to the concave side of the wood veneer.

According to an embodiment, the aqueous coating is applied only on the concave side of the wood veneer. This increases the tensile strength of the veneer in the cross direction of the wood veneer, i.e. in the direction that is transversal with grain direction of the wood veneer.

According to an embodiment, the aqueous coating is applied on the both sides of the wood veneer. In other words, a coating layer is first applied to a first side of the sheet of wood veneer and then a coating layer is applied to a second side of the sheet.

The coating can be performed using any suitable coating method. According to an embodiment, the coating is performed using spray coating, film transfer coating, curtain coating, brush application, roller application, blade coating, extruder coating, or stripe application. Preferably the coating is performed using spray coating.

The method comprises drying the coated sheet using compression pressure and heat, with a contact drying method.

According to an embodiment the temperature may range between 0 and 210° C. in the drying.

According to an embodiment the compression pressure may range between 20 and 500 kPa in the drying.

According to an embodiment, the drying comprises arranging the coated sheet between a first belt assembly and a second belt assembly. The first belt assembly comprises a first metal belt. The second belt assembly comprises a second metal belt and at least one porous screen band or a porous surface section between the second metal belt and the wood veneer. According to an embodiment, the first metal belt and the second metal belt are made of steel. The first metal belt is heated to a first temperature. According to an embodiment, the first temperature is between 120 to 210° C., preferably between 120 to 180° C., more preferably between 130 to 160° C. According to an embodiment, the first metal belt is coated with a silicone or PTFE coating for preventing sticking of the wood veneer to the first metal belt. The second metal belt is cooled to a second temperature that is lower than the first temperature. According to an embodiment, the second temperature is between 0 and 60° C., preferably between 0 and 50° C., particularly preferably between 10 and 50° C. In this embodiment, the drying comprises pressing the first belt assembly and the second belt assembly towards each other during the heating and cooling whereupon a compression pressure is applied to the coated sheet between them from the first metal belt and the screen band or surface section. According to an embodiment, the compression pressure is between 20 to 500 kPa, preferably between 150 to 500 kPa. In this embodiment, the drying comprises allowing water separated from the coated sheet due to the effect of the first temperature to condense into the screen band or into the surface section due to the effect of the second temperature. In this embodiment, the drying comprises removing dried sheet from between the first belt assembly and the second belt assembly. In a preferable embodiment, the removal of water can be made more effective using a vacuum.

In the contact drying method a coated, cut/sliced or rotary-peeled and wet sheet of veneer is fed into a compressing drier where there is a hot upper surface and a cold lower surface on opposite sides of the wood veneer. The veneer is pressed with slight, but sufficient, compression pressure in between the surfaces. The hot upper surface is typically smooth, and the cold lower surface is equipped with either grooving or bolting net for removing water. Additionally, the removal of the water on the lower surface can be made more effective using a vacuum. When there is a clear temperature difference between the surfaces, the water condensates onto the lower surface of the drier. In this way, a significant amount of the water in the wood is removed without the water coming to a boil and, intensely expanding, causing damage to the veneer. However, heating the wood veneer raises the evaporation pressure of the water in the veneer whereupon the water attempts to move to an area where there is lower evaporation pressure, i.e. to the porous first screen band or to the surface section of the second metal belt, where it then condenses due to the influence of a low temperature, i.e. when the temperature is less than dew point. Water is removed from the wood veneer as steam due the influence of the first temperature, it is allowed to condensate in another place under the influence of the second temperature, and it is finally discharged by separating the first screen band or surface section from the dry coated veneer.

The contact drying method allows the drying of each sheet of coated veneer in a different way or the dividing of consistent veneers or sheets of veneers into sections for which a positional drying model can be organized. For this purpose, the conveyance velocity through the drying zone can be adjusted for example progressively, if the process is a continuous one, or the time the sheets of veneer spend in the drying zone can be set, for example according to each individual veneer, when the process is an intermittent one. In the continuously functioning process, the coated wood veneer moves at a standard or varied velocity through the drying zone; whereas in an intermittently functioning process, the coated wood veneer moves at some velocity into the drying zone, stays there for a predefined time and it is then removed at some velocity. The final moisture content of a dried coated wood veneer, is advantageously under 12% by weight, the water concentration of which has thus been calculated from the weight of the dry material also. In this way, it is possible to precision dry the coated wood veneers to the desired level of moisture. This results in a higher average durability and a decrease in divergence. Both of these increase the characteristic durability of the product. Moreover, the coarse-meshed lower surface caused by the cutting checks during rotary peeling can be made denser. This helps in influencing the features of rolling shear strength in the direction of the wood veneer's surface.

Such contact drying method is described in document WO 2007/132057 A1. Drying parameters may suitably be selected according to the amount of water and types of additives used.

Coated Wood Veneer

The invention relates also to coated wood veneer.

The coated wood veneer comprises a sheet of wood veneer and a coating comprising nanocellulose arranged on at least one surface of the sheet.

Particularly, the coated wood veneer according to the invention comprises a sheet of wood veneer and a coating comprising nanocellulose arranged on at least one surface of the sheet, and the nanocellulose has apparent viscosity between 8 000 and 22 000 mPa·s, preferably between 10 000 and 20 000 mPa·s, more preferably between 12 000 and 18 000 mPa·s, in the consistency of 5% by weight at the temperature of 20° C.

The apparent viscosity is suitably measured as described before.

According to an embodiment, the coated wood veneer comprises coating on the concave side of the sheet of wood veneer, whereby the coating is arranged only on the concave side of the sheet of wood veneer.

According to another embodiment, the coated wood veneer comprises coating on the both surfaces of the sheet of wood veneer, whereby the coating is arranged on both surfaces of the sheet of wood veneer.

The nanocellulose comprises cellulose nanofibrils having an average fibril length from 100 to 1000 nm, preferably 100 to 500 nm.

According to an embodiment, the nanocellulose comprises lignin at most 10% by weight of nanocellulose, preferably 0.01 to 5% by weight, more preferably from 0.01 to 3% by weight.

According to an embodiment, the nanocellulose is enzymatic nanocellulose.

According to another embodiment, the enzymatic nanocellulose comprises lignin not more than 3% by weight of nanocellulose, preferably from 0.01 to 5% by weight, more preferably from 0.01 to 3% by weight.

According to an embodiment, the coating comprises an additive selected from the group consisting of light absorbing additives, anti-mould agents, anti-microbial agents, fire-retarding agents, colour agents, decorative components, surface active agents, and combinations thereof.

According to an embodiment, the coating has a thickness from 1 to 300 μm, preferably from 2 to 200 μm, particularly preferably from 5 to 150 μm.

According to an embodiment, coated wood veneer may comprise a coating comprising one layer of the coating, or more than one layers of the coating, where the coating may be the same or different, on one side of the wood veneer or on both side of the wood veneer.

The coated wood veneer described above can be used for producing plywood or laminated veneer lumber, covering wooden panels, such as all-wood panels, particleboard panels or fibreboard panes, for example, for producing furniture or for building construction.

The coated wood veneer described above is particularly suitable for producing plywood. The plywood can consist only of coated wood veneer or it can be combined with uncoated wood veneer. Preferably coated wood veneer is arranged as one outermost layer or as the both outermost layers of the plywood. The plywood may comprise coated wood veneer produced from same or different wood species.

The disclosure relates also to plywood comprising at least one coated wood veneer described above.

EXAMPLES

Example 1, Apparent Viscosity of Enzymatic Nanocellulose

The apparent viscosity of fibrillated sample was measured with a Brookfield rheometer RVDV-III. The standard method was based on vane geometry, which is widely recommended for paste-like materials, gels, and fluids, where suspended solids migrate away from the measurement surface of standard smooth spindle geometries such as cone—plate, coaxial cylinder, parallel—plate, or a disk spindle immersed in a beaker (Barnes & Nguyen, 2001).

The fibrillated sample was diluted with water to a constant concentration of 10, 5 and 2% by weight before measurement. The samples were first mixed for 10 min and at 300 rpm using a blade impeller and a 600-ml beaker. Afterwards, the mixed samples were further dispersed using Ultra Turrax homogenizer for two minutes at 14000 rpm. Viscosity measurements were done in a 250-ml Pyrex beaker; each sample was left to stand still for 30 min after dilution and prior to measurement. This allowed each sample to regain their initial viscosity for a fixed period of time.

The sample temperature was maintained at 20±1° C. by tempering in a laboratory water bath between the measurements. The measuring program registered 300 measuring points with one-second intervals at 10 rpm. Apparent viscosity was measured twice from each sample, and between measurements, the samples were gently mixed while the temperature was kept at 20±1° C. Average and standard deviation were calculated from the measurement data for the five final seconds of each speed level from both parallel measurements. Results are presented in Table 1 below.

(Barnes, H. A., and Nguyen, Q. D. (2001). "Rotating vane rheometry—A review," J. Non-Newt. Fluid Mech. 98(1), 1-14.)

TABLE 1

| Results | | |
|---|---|---|
| Sample consistency, % by weight | Spindle | Average apparent viscosity, mPa · s |
| 10 | V75 | 82 000 |
| 5 | V72 | 15 000 (range of variation 12 000-18 000) |
| 2 | V71 | 120 |

Example 2, Coating of Wood Veneer

Undried birch veneer was coated with an aqueous composition comprising 8.7% by weight of enzymatic nanocellulose (obtained from acid bleached softwood pulp containing 2 to 4% by weight of lignin) having an apparent viscosity of 15 000 mPa·s in the consistency of 5% by weight at the temperature of 20° C. The coating was carried out by spraying one layer of coating on the veneer. The coating was applied to the veneer to provide nanocellulose content of 5-18.3 g/m$^2$, with the average of 10-15 g/m$^2$. The coated veneer was dried using compression pressure of 196 kPa and temperature of 140° C., with the aid of vacuum so that the absolute air pressure was 25 kPa. Dry veneer comprising a coating (film) with a thickness of about 20 μm was obtained. The tensile strength in the cross direction was measured using modified ISO 1924-2 standard method. The tensile strength in cross direction of uncoated veneer dried with contact drying method was 1.47 N/mm², and that of the coated veneer dried with contact drying method was 1.83 N/mm², which is about 25% higher than that of uncoated veneer. In comparison, fresh newly cut veneer has a tensile strength in cross direction of 1.46 N/mm² and uncoated veneer dried with a traditional method has a tensile strength in cross direction of 1.26 N/mm².

The invention claimed is:

1. A method for treating wood veneer, the method comprising:
providing at least one sheet of wood veneer;
coating at least one side of the at least one sheet of wood veneer with an aqueous coating composition comprising nanocellulose in an amount between 4 to 18% by weight, calculated of the weight of the total coating composition, the nanocellulose having apparent viscosity between 8,000 and 22,000 mPa·s after the aqueous coating composition comprising the nanocellulose is mixed for about 10 minutes at about 300 rpm and then mixed for about 2 minutes at 14,000 rpm, in a consistency of 5% by weight at a temperature of 20 ° C. to obtain a coated sheet of wood veneer; and
drying the coated sheet using compression pressure and heat.

2. The method according to claim 1, wherein the aqueous coating composition is applied on the sheet of wood veneer in an amount between 2 and 100 g/m², measured as the amount of dry coating composition.

3. The method according to claim 1, wherein the nanocellulose has apparent viscosity between 10,000 and 20,000 mPa·s.

4. The method according to claim 1, wherein the nanocellulose is enzymatic nanocellulose.

5. The method according to claim 1, wherein the nanocellulose comprises lignin at most 10% by weight of nanocellulose.

6. The method according to claim 1, wherein the aqueous coating composition comprises water between 75 and 96% by weight of total coating composition.

7. The method according to claim 1, wherein the aqueous coating composition comprises nanocellulose between 7 and 18% by weight of total coating composition.

8. The method according to claim 1, wherein the aqueous coating composition comprises at least one additive selected from the group consisting of light absorbing additives, anti-mold agents, anti-microbial agents, fire-retarding agents, color agents, decorative components, surface active agents and combinations thereof.

9. The method according to claim 1, wherein the wood veneer is rotary peeled wood veneer.

10. The method according to claim 1, wherein the aqueous coating is applied only on a concave side of the wood veneer.

11. The method according to claim 1, wherein the coating is performed using one of spray coating, film transfer coating, curtain coating, brush application, roller application, blade coating, and stripe application.

12. The method according to claim 1, wherein a temperature in the drying is between 0 and 210 ° C.

13. The method according to claim 1, wherein the compression pressure in the drying is between 20 and 500 kPa.

14. The method according to claim 1, wherein the drying comprises:
arranging the sheet between a first belt assembly and a second belt assembly, the first belt assembly comprising a first metal belt, the second belt assembly comprising a second metal belt, at least one porous screen band or a porous surface section being disposed between the second metal belt and the wood veneer, the first metal belt being heated to a first temperature, the second metal belt being cooled to a second temperature that is lower than the first temperature,
pressing the first belt assembly and the second belt assembly towards each other during the heating and cooling whereupon the compression pressure is applied to the sheet between the first belt assembly and the second belt assembly from the first metal belt and the screen band or surface section,
allowing water separated from the sheet due to the effect of the first temperature to condense into the screen band or into the surface section due to the effect of the second temperature, and
removing the sheet that is dried from between the first belt assembly and the second belt assembly.

15. The method according to claim 14, wherein the first temperature is from 120 to 210° C. and the second temperature is between 0 and 60° C.

16. The method according to claim 1, wherein a tensile strength in cross direction of the wood veneer is 1.83 N/mm².

* * * * *